United States Patent [19]

Migozzi et al.

[11] Patent Number: 4,810,056
[45] Date of Patent: Mar. 7, 1989

[54] COLLIMATED RELIEF DISPLAY DEVICE

[75] Inventors: Jean-Blaise Migozzi, Orsay; Claude Maureau, Paris, both of France

[73] Assignee: Thomson CSF, Paris, France

[21] Appl. No.: 162,946

[22] Filed: Mar. 1, 1988

[30] Foreign Application Priority Data

Mar. 3, 1987 [FR] France ................................. 87 02834

[51] Int. Cl.$^4$ ........................ G02B 3/00; G02B 9/02; G02B 27/00; G02B 27/22
[52] U.S. Cl. ..................................... 350/131; 350/167; 350/413; 350/415
[58] Field of Search ............... 350/130, 131, 167, 413, 350/415

[56] References Cited

U.S. PATENT DOCUMENTS

| 2,021,162 | 11/1935 | Walton | 350/131 X |
| 2,351,032 | 6/1944 | Gabor | 350/131 X |
| 3,658,407 | 4/1972 | Kitano et al. | 350/413 X |
| 3,860,955 | 1/1975 | Shinozaki | 350/167 X |

FOREIGN PATENT DOCUMENTS

| 0097250 | 1/1984 | European Pat. Off. |
| 0170523 | 2/1986 | European Pat. Off. |
| 0194196 | 9/1986 | European Pat. Off. |
| 391109 | 12/1978 | France |

OTHER PUBLICATIONS

Patent Abstract of Japan, vol. 8, No. 169 (p-292) (1606), 4 Aug. 1984; & JP-A-59 64 813 (Nippon Denki K.K.) Apr. 12, 1984.

Primary Examiner—John K. Corbin
Assistant Examiner—David J. Edmondson
Attorney, Agent, or Firm—Cushman, Darby & Cushman

[57] ABSTRACT

The device provided makes it possible to see a collimated light image in relief. It is formed from a conventional collimator assembly comprising a convergent lens at the focal point of which the light representation to be collimated is placed. This light representation may be formed on the screen of a cathode ray tube. The screen is equipped with a micro-lens lattice. Each micro-lens is coupled to at least two adjacent pixels corresponding to the display of the same image point. A divergent optic is placed between the micro-lens lattice and the collimation optic so as to form with a convergent optic an assembly of the teleobjective type and to provide spatial separation of the collimated images and allow separate observation of a first image with the right eye and of second image with the left eye in the eye box.

7 Claims, 4 Drawing Sheets

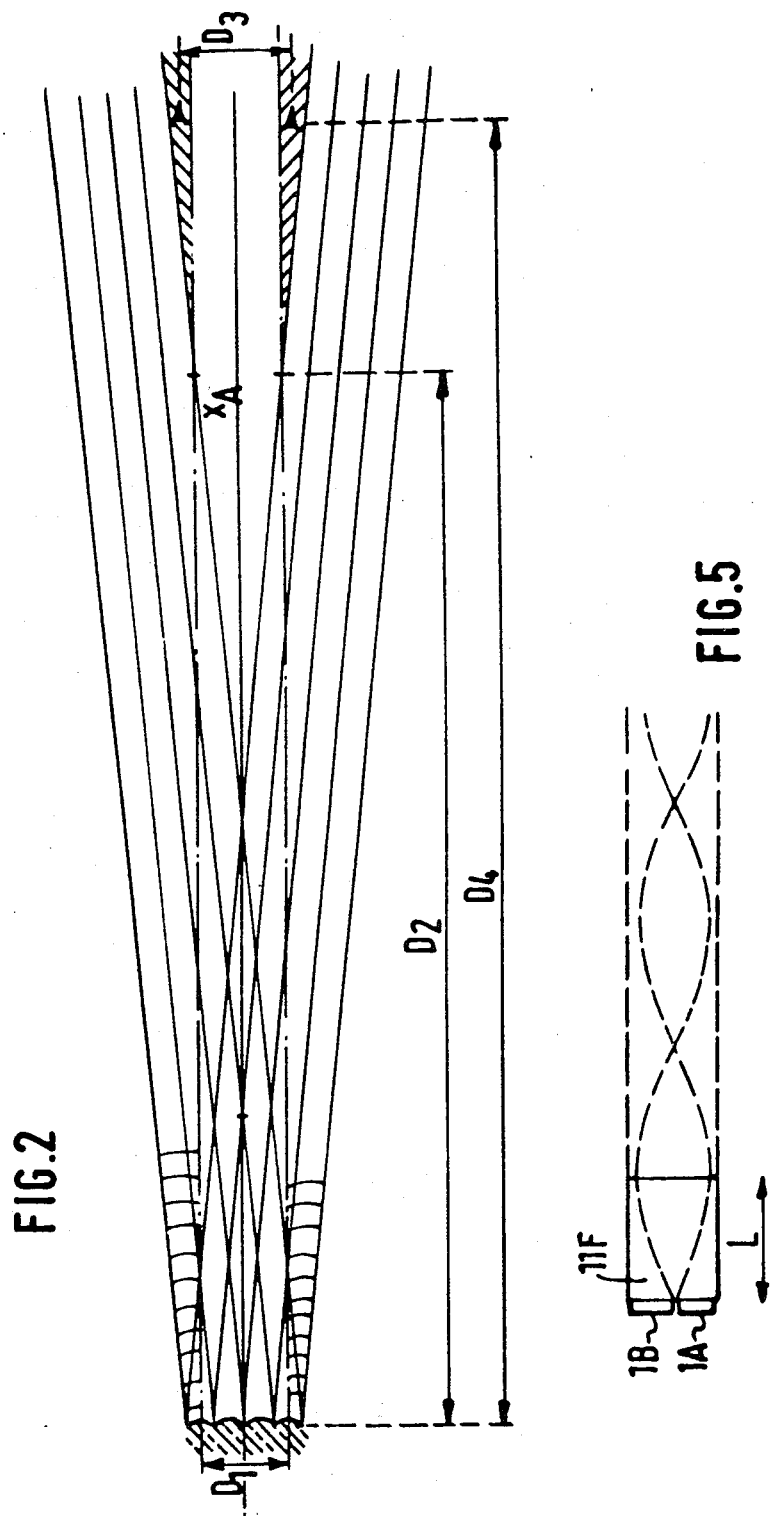

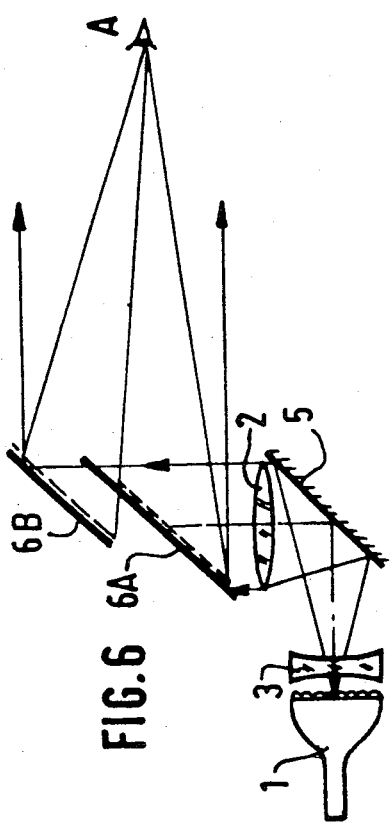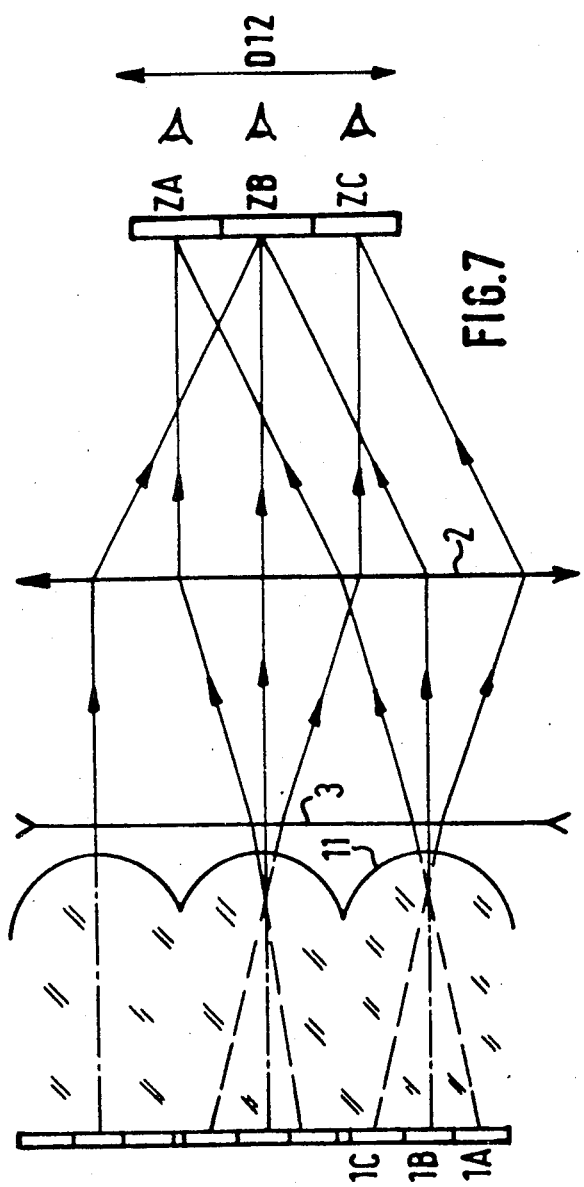

4,810,056

COLLIMATED RELIEF DISPLAY DEVICE

BACKGROUND OF THE INVENTION

The present invention relates to a collimated relief display device and may be applied in aeronautics to a head down or head up display.

A collimated relief display device includes, in a way known per se, a light image generator and an optical collimation system in the focal plane of which the light image is situated for projecting it to infinity. The generators usually used are either cathode ray tubes, or liquid crystal image forming devices. In the case of a cathode ray tube, the image may be produced by haphazard scanning (random scanning) or by television scanning (line by line scanning); in the case of liquid crystals, the image corresponds to the distribution in an X and Y matrix of points or pixels.

It is further known to use micro-lenses for giving the impression of images with moving subjects. For that, a lattice of micro-lenses is disposed above a plurality of flat images cut into strips and juxtaposed in the focal planes of the microlenses. By rotating the object thus equipped in front of his eyes, the observer may see successively the different images which reproduce a scene with moving subjects.

The purpose of the invention is to produce a relief impression of the collimated image by forming two monochrome images intended to be seen respectively by the right eye and by the left eye.

SUMMARY OF THE INVENTION

The invention provides then a collimated relief display device including a generator of a first monochrome light image whose points are distributed in an X and Y pixel matrix, and an optical collimation system for projecting to infinity this first image positioned at its focal point; said generator producing simultaneously at least one light image of the same shade and interlaced with the first one with a shift equal to the value of a pixel along one of said directions X or Y of the matrix, said generator being equipped with a micro-lens matrix, each micro-lens being coupled to an assembly of at least two pixels of the matrix in said shift direction and corresponding to the display of an image point having the same coordinates for each image, said adjacent pixels being situated in the focal plane of the associated micro-lens; the display device further including a divergent optical system placed between the micro-lens matrix and the optical collimation system so as to form an assembly of the teleobjective type ensuring the spatial separation of the collimated images and the separate observation of the first image with one eye and of a second image with the other eye in an observation zone, called eye box, with defined pupil, as well as its distance with respect to the optical collimation system.

BRIEF DESCRIPTION OF THE DRAWINGS

The features of the present invention will be clear from the following description given by way of example, with reference to the accompanying Figs which show:

FIG. 2, a diagram showing the positioning requirements for different image observation for each eye of the observer FIG. 3, a diagram of a collimated relief display device in accordance with the invention;

FIG. 5, a diagram of a detail relative to the use of index gradient, called self-focusing fibers;

FIG. 6, a diagram relative to one application to a head up display device of the invention; and FIG. 7, a diagram of the display device considered in a case where each image point is redistributed in the form of three pixels at the level of the light image generator.

DESCRIPTION OF THE PREFERRED EMBODIMENTS

Figure 1:
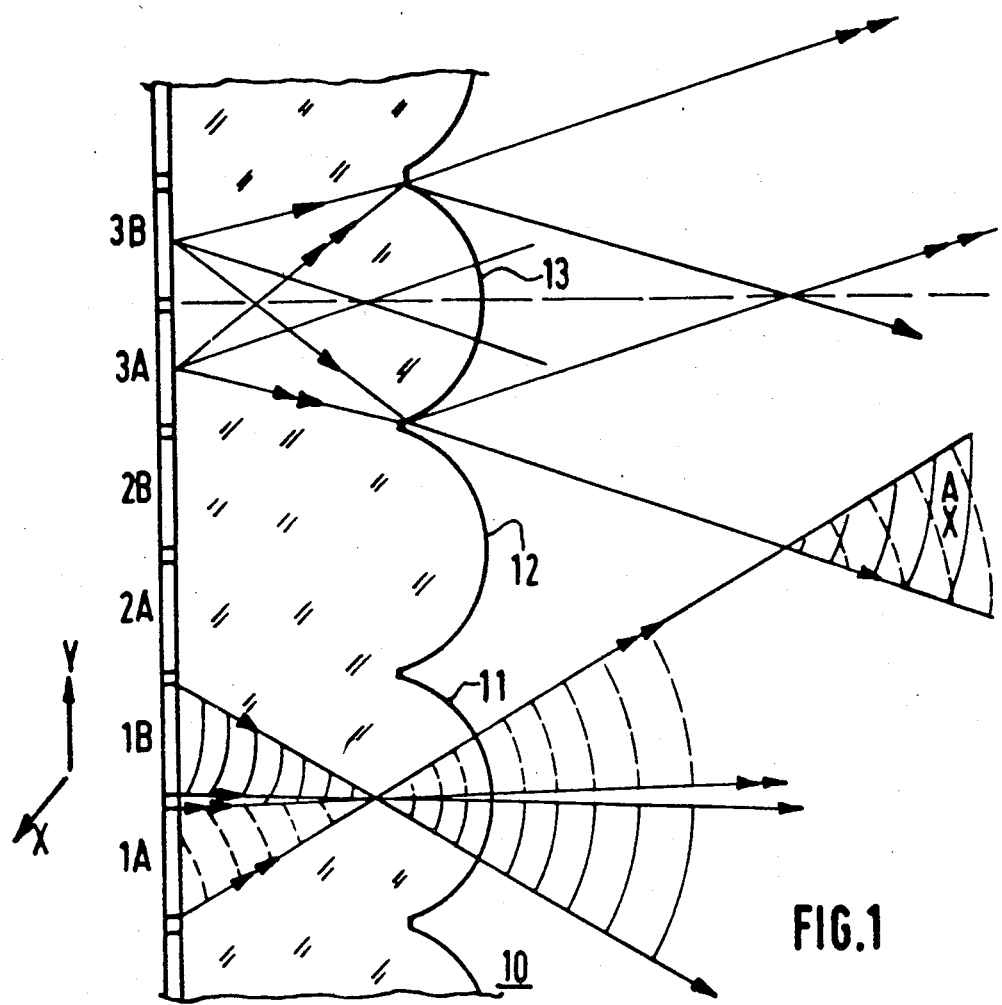
FIG. 1, a partial diagram of the device relative to the structure of the image generator equipped with micro-lenses.

FIG. 1 shows a distribution of micro-lenses 11, 12, 13 etc..., each being coupled with a pair of pixels positioned in the corresponding focal plane. For example, micro-lens 11 is coupled with the two pixels $1a$, $1b$ in the column direction Y shown. An identical distribution is made in the line direction X for the successive pixels of the other pixel columns. Considering an associated matrix distribution of the micro-lenses in which the number of columns is equal to that of the columns of pixels, two successive pixels of a column are associated each time with a micro-lens. The number of micro-lenses N is equal to that of the points of each image. The pixels $1a$, $2a$, $3a$ etc... form a first image and the pixels $1b$, $2b$, $3b$, etc... form the second image. The pixel matrix comprises in all 2N pixels. For the micro-lens 11, the fields have been shown in which the radiation emitted by the pixels $1a$ and $1b$ respectively is to be found. This representation is also made for some rays of pixels $3a$ and $3b$. Each pair of pixels corresponds to an image point having the same coordinates in the first and in the second image. It can be seen in FIG. 1 that an observer who is placed too close, for example at A, will receive radiation coming both from a first image through point $1a$ and from the second image through point $3b$, which must be avoided so as to obtain perception of relief.

FIG. 2 shows the progressive movement of the observer away from the plane of the micro-lenses so as to obtain a separate vision of the images. The interpupil distance is represented by D3 and it is in practice of the order of 6.5 cm. In this example a relatively small number has been considered, limited to four, for the micro-lenses. D1 is the distance between the optical axes of the endmost micro-lenses. It can be seen that the observer's eyes must be situated in the hatched zone, i.e. at a distance D4 preferably greater than the minimum distance D2 indicated. It can be seen that the more micro-lenses there are, the greater the minimum distance D2 must be away from the plane of the micro-lenses. The number of micro-lenses is such in practice that the distance D2, can be considered very large and corresponding practically to the placing of the eyes at infinity so as to satisfy the vision of relief.

Figure 3:
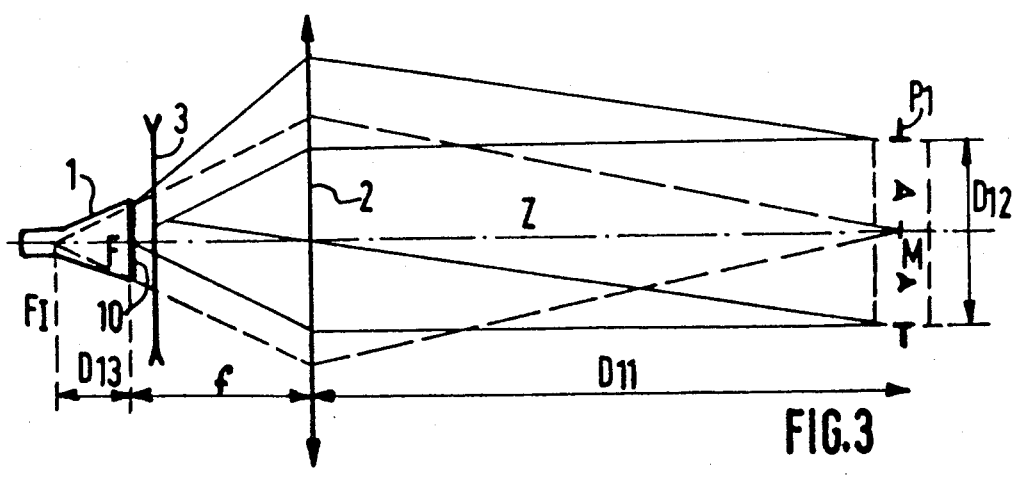

FIG. 3 shows a collimated display device in accordance with the invention with the light image generator 1 formed by a cathode ray tube whose screen is formed in the way described in FIG. 1 having at the front the lattice of micro-lenses 10. The convergent lens 2 shows the optical collimation formula which projects to infinity the light representation formed by the screen of the cathode ray tube 1 positioned in the focal plane of this lens.

Figure 4:
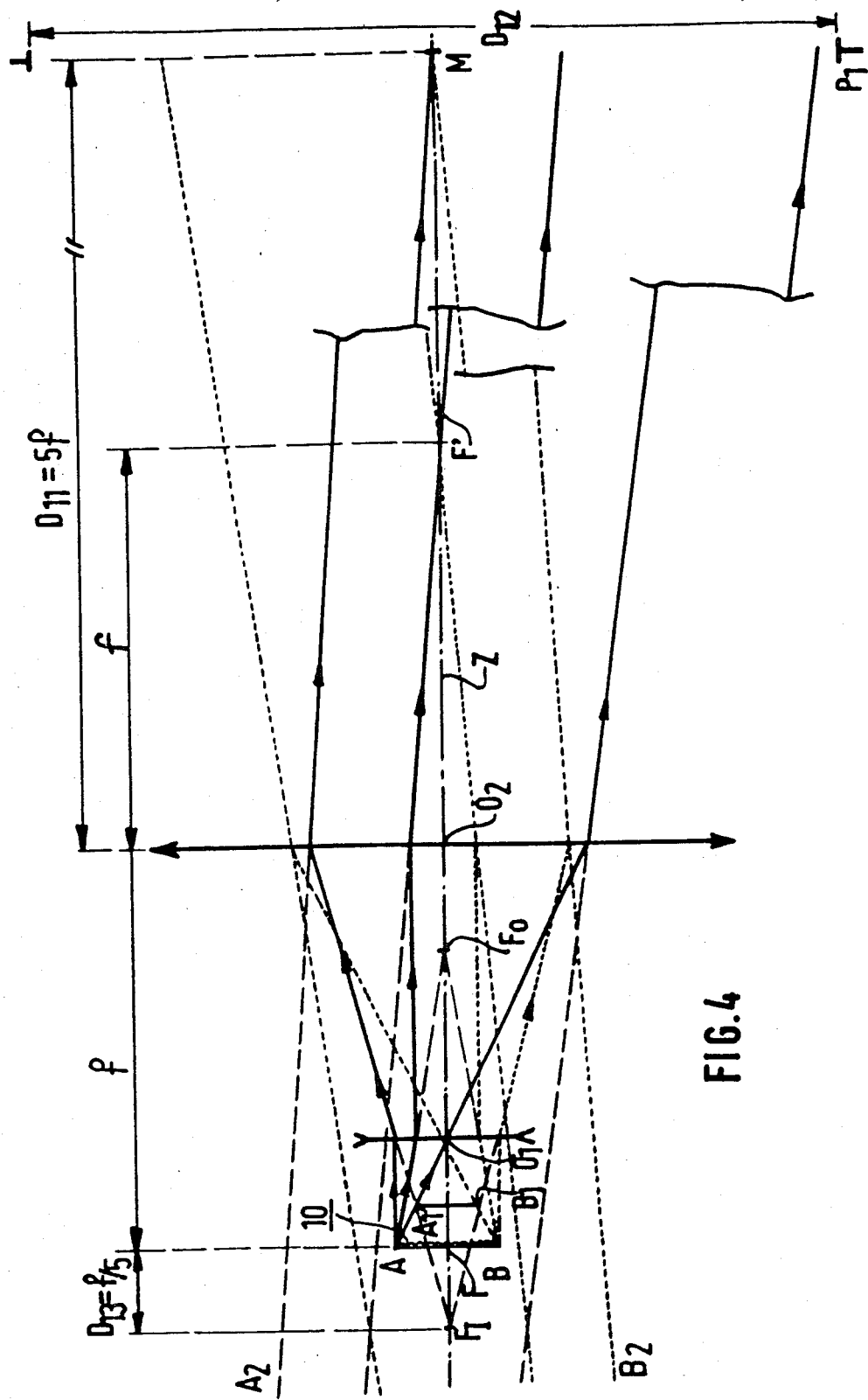
FIG. 4, a diagram of the device of FIG. 3 illustrating the paths of the rays and the formation of the collimated images.

So that this aim may be attained and so that each eye only sees the image which is intended for it, a divergent lens 3 is inserted between the plane of the micro-lenses 10 and the convergent lens 2. The assembly is similar to that of a teleobjective. The light paths are shown in detail in FIG. 4. The divergent lens 3 forms, of the light object AB corresponding to the screen equipped with the micro-lenses, a virtual image A1, B1 which is taken into account as a virtual object by the convergent lens 2 which gives a final image of it A2, B2. With judicious positioning of elements 2 and 3 of plane 10, the image A2, B2 is produced at a great distance from the collimating lens 2 and is seen by each of the eyes as if it were in practice thrown back to infinity. This condition is obtained if the image focus FI of the divergent lens 3 is conjugate with point M situated on the optical axis and in the plane of the eye box. The eye box is shown by the pupil Bl and corresponds to a zone situated at a predetermined distance D11 from lens 2 and whose width D12 corresponds to about twice the interpupil distance, namely about 13 cm. Because of the presence of the divergent optical system 3, the separate vision of the images for each eye is preserved on each side of the central axis Z forming the optical axis of the optical system 2 and 3 and on which the image AB is centered at 10.

By way of example, we may consider a distance of the order of 50 cm for D11, a focal length f of 10 cm for the optical collimation system 2 and a distance D13 between the respective focal points F and FI of the order of 2 cm.

Among the possible variants, the micro-lens lattice may be replaced by N index gradient optical fiber elements, the index varying radially so as to produce an optical path comprising antinodes and nodes as shown schematically in FIG. 5. A small element of length L of this self focusing fiber, also called selfoc, is taken whose power is for example 10 diopters per meter. The length L corresponds to a distance between an antinode and a node. The element 11f shown allows the microlens 11 to be replaced and it also comprises at one end the pair of pixels 1a and 1b.

FIG. 6 relates to an application to a head up display in aeronautics. The collimated image is reflected by a combination glass or a known assembly of two parallel glasses 6a, 6b shown for increasing the pupil. A flat reflecting mirror 5 bends the optical diagram in a known way. The observer at A looks at the collimated relief images and also the external scene through glasses 6a and 6b.

Among the other possible variants, the one illustrated in FIG. 7 may be considered where the images are three in number instead of 2. In this case, each micro-lens, or fiber element, is associated with a group of three pixels, for example 1a, 1b 1c for the micro-lens 11 so as to form three juxtaposed zones ZA, ZB, ZC in the eye box. The vision of two successive zones Z1 and ZB or ZB and ZC, by the eyes gives the impression of relief. This solution makes it possible to increase the width D12 of the eye box by an interpupil unit, namely 6.5 cm. In this solution, as well as in the preceding one, the light images formed must be of the same shade either monochrome or of the same color. Consequently, the cathode ray tube or liquid crystal matrix image generator is provided for supplying these monochrome images. The liquid crystal version makes it possible to incorporate the microlenses 10 more readily.

What is claimed is:

1. A collimated relief display device comprising:
   a generator of a first monochrome light image to be displayed, formed of points distributed in an X and Y matrix arrangement of pixels, each point corresponding to adjacent pixels in one of said directions X or Y;
   an optical collimation system for projecting to infinity this first image positioned at its focal point;
   and means for forming at least a second light image of the same shade and interlaced with the first one with a shift equal to the value of a pixel along a shift direction equal to one of the directions X or Y of the matrix, said means including:
   on the generator a lattice of micro-lenses, each micro-lens being coupled to at least two adjacent pixels of the matrix in said shift direction and corresponding to the display of the same image point having the same coordinates for each image, said adjacent pixels being situated in the focal plane of the associated microlens;
   and a divergent optic placed between the micro-lens lattice and the collimation optic so as to form an assembly of the teleobjective type ensuring the spatial separation of the collimated images and observation of the first image with one eye and of a second image with the other eye in an observation zone, called eye box, with defined pupil as well as its distance with respect to the optical collimation system.

2. The display device as claimed in claim 1, wherein each micro-lens is coupled to two pixels of the matrix so as to form two light images.

3. The display device as claimed in claim 1, wherein each micro-lens is coupled to three pixels of the matrix so as to form three light images and to provide relief observation in two successive zones and correlatively in an enlarged eye box.

4. The display device as claimed in claim 1, wherein the micro-lens lattice is formed using index gradient fiber elements.

5. The display device as claimed in claim 1, wherein the generator is a cathode ray tube.

6. The display device as claimed in claim 1, wherein the generator comprises a liquid crystal matrix.

7. The display device as claimed in claim 1, further comprising a combiner for a head up or head down collimated display device.

* * * * *